United States Patent

Wagatsuma et al.

(10) Patent No.: US 7,499,271 B2
(45) Date of Patent: Mar. 3, 2009

(54) HARD DISK ENCLOSURE BLADE

(75) Inventors: Takeshi Wagatsuma, Kanagata-ken (JP); Michihiro Okamoto, Kanagawa-ken (JP); Kenji Hidaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 11/385,949

(22) Filed: Mar. 20, 2006

(65) Prior Publication Data

US 2007/0217142 A1    Sep. 20, 2007

(51) Int. Cl.
G06F 1/16 (2006.01)
H05K 5/00 (2006.01)
H05K 7/00 (2006.01)

(52) U.S. Cl. ..................... 361/685; 361/726
(58) Field of Classification Search ........... 361/617, 361/683, 685, 724, 725, 726; 211/88.02, 211/26; 312/9.11, 221, 332.1, 333
See application file for complete search history.

(56) References Cited

U.S. PATENT DOCUMENTS

| | | | | |
|---|---|---|---|---|
| 5,173,845 | A * | 12/1992 | Shaw | 361/754 |
| 5,717,570 | A * | 2/1998 | Kikinis | 361/685 |
| 6,252,514 | B1 * | 6/2001 | Nolan et al. | 361/685 |
| 6,392,884 | B1 * | 5/2002 | Chou | 361/687 |
| 6,498,723 | B1 * | 12/2002 | Konshak et al. | 361/685 |
| D481,384 | S * | 10/2003 | Alo | D14/301 |
| 6,762,934 | B2 * | 7/2004 | Kitchen et al. | 361/685 |
| 6,774,808 | B1 * | 8/2004 | Hibbs et al. | 361/685 |
| 6,856,508 | B2 * | 2/2005 | Rabinovitz | 361/685 |
| 6,952,342 | B1 * | 10/2005 | Chen | 361/685 |
| 6,956,745 | B2 * | 10/2005 | Kerrigan et al. | 361/726 |
| 7,035,096 | B2 * | 4/2006 | Franz et al. | 361/685 |
| 7,039,299 | B2 * | 5/2006 | Onodera | 361/685 |
| 7,126,817 | B2 * | 10/2006 | Li | 361/685 |
| 7,170,743 | B2 * | 1/2007 | Shimada et al. | 361/685 |
| 7,180,755 | B1 * | 2/2007 | Reznikov | 361/801 |
| 7,251,145 | B1 * | 7/2007 | Reznikov | 361/825 |
| 7,264,490 | B1 * | 9/2007 | Reznikov | 439/152 |
| 7,280,352 | B2 * | 10/2007 | Wilson et al. | 361/685 |
| 2003/0030991 | A1 * | 2/2003 | Riddiford et al. | 361/724 |
| 2004/0012921 | A1 * | 1/2004 | Hidaka et al. | 361/685 |
| 2004/0264146 | A1 * | 12/2004 | Kerrigan et al. | 361/726 |
| 2005/0030721 | A1 * | 2/2005 | Shimada et al. | 361/726 |
| 2005/0157464 | A1 * | 7/2005 | McAlister | 361/685 |
| 2006/0171110 | A1 * | 8/2006 | Li | 361/685 |
| 2006/0250766 | A1 * | 11/2006 | Blaalid et al. | 361/685 |
| 2007/0091559 | A1 * | 4/2007 | Malone | 361/685 |

* cited by examiner

*Primary Examiner*—Anatoly Vortman
*Assistant Examiner*—Adrian S Wilson

(57) ABSTRACT

A hard disk enclosure blade includes an enclosure insertable into a rack, a number of slots, a lever, and a flap. Each slot can receive a tray holding hard disk drives. The lever allows the enclosure to be pushed into and pulled from the rack. The lever has an open position in which the enclosure is removable from the rack, and a closed position in which the enclosure is not removable. The flap has a first flap position in which the flap is disposed across the slots and in which the lever is movable from its closed to its open position, and a second flap position in which the lever is not movable from the closed to the open position. Where the slots are all empty, the flap reverts to the first flap position. Insertion of a tray into a slot forces the flap to the second flap position.

16 Claims, 6 Drawing Sheets

HARD DISK ENCLOSURE BLADE

FIELD OF THE INVENTION

The present invention relates generally to a hard disk enclosure blade, and more particularly to such a blade that is not removable from a rack unless it is empty of hard disk drives.

BACKGROUND OF THE INVENTION

In data center and other environments, a large number of computing peripherals are usually organized in such a way as to efficiently use the physical space available for them. For instance, many such peripherals are rack-mounted. Rack-mounted peripherals have a standard width that enables them to be inserted into industry-standard racks. Racks may themselves be seven feet or more in height, allowing a large number of rack-mounted peripherals to be inserted into a single rack.

A hard disk enclosure blade is a rack-mounted peripheral that accepts a number of trays of hard disk drives. Therefore, in a relatively small space, a large number of hard disk drives can be stored. For instance, one type of hard disk enclosure blade accepts eight trays. Each tray can hold three hard disk drives, such that the hard disk enclosure itself can store a total of twenty-four hard disk drives.

Such a hard disk enclosure blade that is fully populated with twenty-four hard disk drives can be relatively heavy, however. For instance, a fully populated hard disk enclosure blade can weigh more than twenty kilograms, or more than forty-four pounds. Administrators who are responsible for managing such rack-mounted peripherals may not realize that such hard disk enclosure blades are so heavy. Therefore, they may try to remove a fully populated hard disk enclosure blade from a rack, not realizing the full weight of the fully populated blade.

As a result, there is a real potential for the blade accidentally dropping to the floor. While dropping any type of rack-mounted peripheral can potentially cause damage to the peripheral, the chance for damage is heightened with hard disk enclosure blades, because hard disk drives are sensitive to extreme force impacts, which can occur on their being dropped and hitting the floor. For this and other reasons, therefore, there is a need for the present invention.

SUMMARY OF THE INVENTION

The present invention relates to a hard disk enclosure blade. In one embodiment, such a blade includes an enclosure that is insertable into a rack. There are a number of slots, with each slot receptive to a tray capable of holding one or more hard disk drives. The blade includes a lever by which the enclosure is pushed into the rack and pulled out of the rack. The lever has an open position in which the enclosure is removable from the rack, and a closed position in which the enclosure is not removable from the rack. The blade includes a flap having a first flap position in which the flap is disposed across the slots and in which the lever is movable from its closed position to its open position. The flap also has a second flap position in which the lever is not movable from the closed position to the open position. Where the slots are all empty, the flap reverts to the first flap position, and insertion of a tray into one of the slots forces the flap to the second flap position.

In one embodiment, the blade further includes one or more pins. The pins have a first pins position in which the lever is movable from the closed position to the open position, and a second pins position in which the lever is prevented from moving from the closed position to the open position. In the first flap position, the flap indirectly allows the lever to move from the closed position to the open position, in that the flap allows the pins to move from the second pins position to the first pins position. In the second flap position, the flap indirectly prevents the lever to move from the closed position to the open position, in that the flap prevents the pins from moving from the second pins position to the first pins position.

In one embodiment, the blade further includes a release button connected to the pins. Pressing the release button causes the pins to move from the second pins position to the first pins position where the flap is in the first flap position. Thus, in the first flap position, the flap does not block a path that the release button travels when being pressed so that the release button is able to cause the pins to move from the second pins position to the first pins position. By comparison, in the second flap position, the flap blocks the path that the release button travels when being pressed, so that the release button is unable to cause the pins to move from the second pins position to the first pins position.

In one embodiment, then, in the first pins position, the pins do not block the lever so that the lever is able to move from the closed position to the open position. In the second pins position, the pins block the lever so that the lever is unable to move from the closed position to the open position. In one embodiment, the blade further includes a spring to default the flap to the first flap position and to revert the flap to the first flap position upon complete emptying of the slots. Insertion of a tray into one of the slots, where the slots are previously empty, pushes the flap so that it enters the second flap position.

Embodiments of the invention provide for advantages over the prior art. The hard disk enclosure blade of the present invention is not removable from a rack unless it is completely empty of hard disk drive trays. In one embodiment, the blade weighs only about eight kilograms, or about eighteen pounds, when it is completely empty, as compared to more than twenty kilograms, or more than forty-four pounds, when it is completely populated with full trays. Therefore, there is less chance of the blade being too heavy for a single administrator removing the empty blade from the rack. Furthermore, even the administrator drops the blade during removal of the blade from the rack, there is no potential for hard disk drive damage, since the blade is only removable when it is completely empty of hard disk drive trays, and thus completely empty of hard disk drives.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
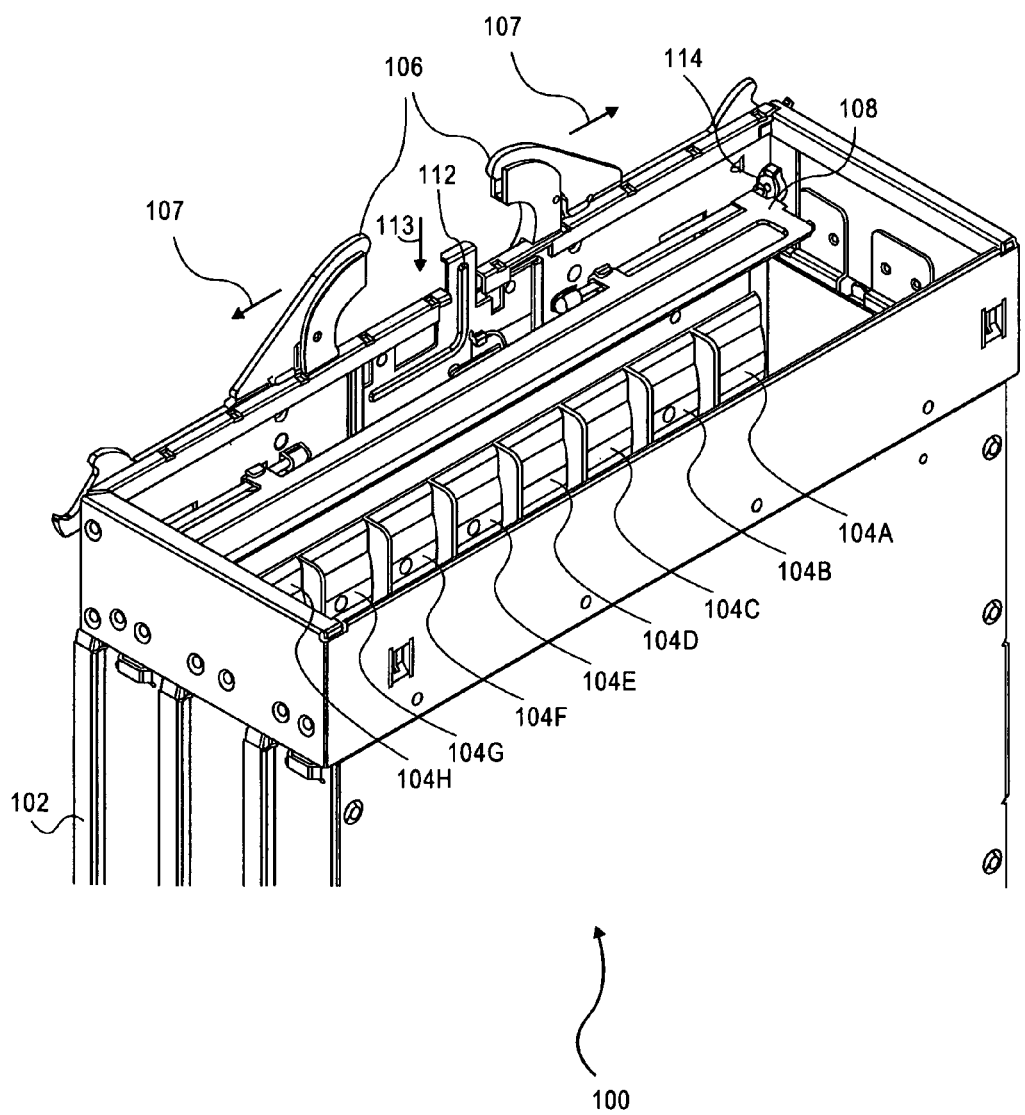
FIGS. 1 and 2 are diagrams of a hard disk enclosure blade, according to an embodiment of the invention.
Figure 2:
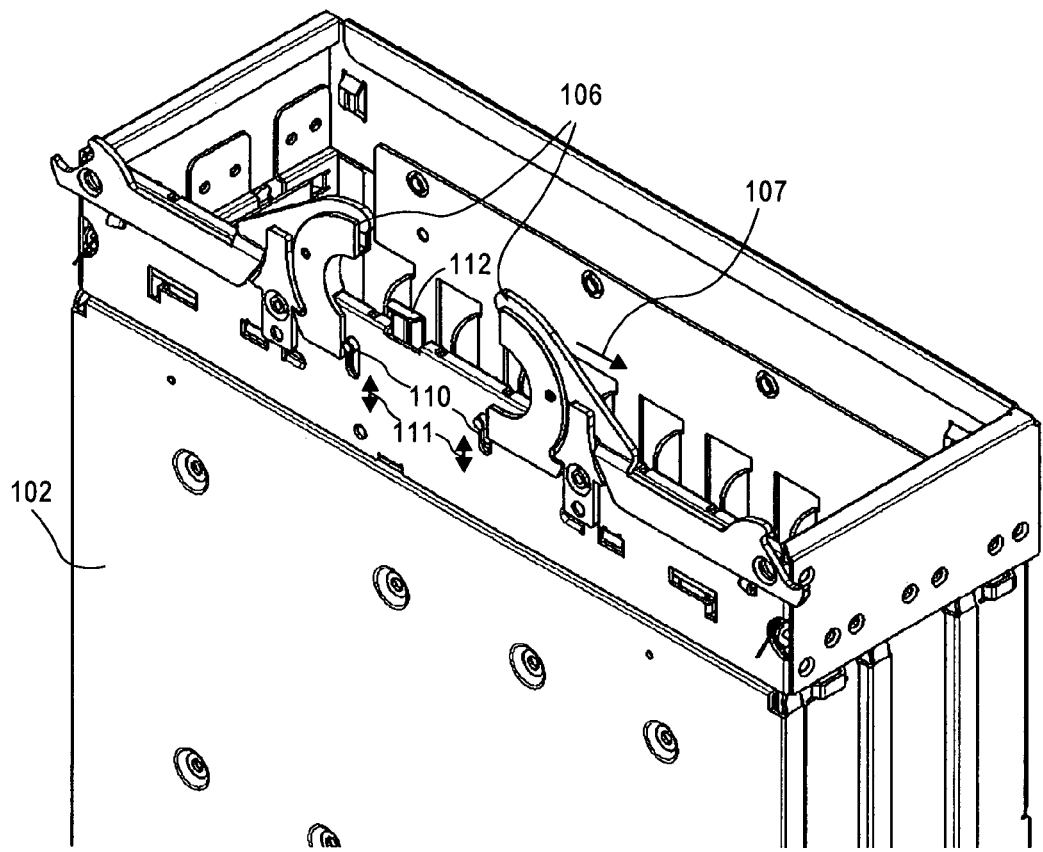

FIGS. 1 and 2 show a hard disk enclosure blade 100, according to an embodiment of the invention. The hard disk enclosure blade 100 includes an enclosure 102, as well as a number of slots 104A, 104B, 104C, 104D, 104E, 104F, 104G, and 104H, collectively referred to as the slots 104. The hard disk enclosure blade 100 also includes a lever 106, a flap 108, pins 110, a release button 112, and springs 114.

The enclosure 102 is adapted to be inserted into a rack of the type that may conventionally store computing peripherals. The enclosure 102 defines the slots 104. Each of the slots 104 is receptive to a tray that is capable of holding one or more hard disk drives, which are not shown in FIGS. 1 and 2. For instance, each such tray may hold three hard disk drives, so that a total of twenty-four hard disk drives can be stored by the hard disk enclosure blade 100.

The lever 106 is that by which the enclosure 102 is pushed into the rack and pulled out of the rack. The lever 106 has a closed position, which is specifically depicted in FIGS. 1 and 2, in which the enclosure 102 is locked within the rack in question, and is not removable from the rack. The lever 106 is movable to an open position, by pushing each portion of the lever 106 outwards towards the sides of the enclosure 102, as indicated by the arrows 107. In the open position of the lever 106, the enclosure 102 is removable from the rack within which it has been inserted.

The flap 108 has a first flap position, as shown in FIG. 1 in particular, in which the flap 108 is disposed across the slots 104. In the first flap position of the flap 108, the lever 106 is ultimately movable from its closed position to its open position. In the first flap position, the flap 108 is at substantially a ninety-degree angle to opening within the enclosure 102. The flap 108 also has a second flap position, in which it is pushed against and parallel to a side of the enclosure 102 at which the lever 106 and the release button 112 are disposed.

When all the slots 104 are empty, and none contain a tray, the flap 108 reverts to the first flap position. However, insertion of a tray into any of the slots 104, where all of the slots 104, pushes or forces the flap 108 to the second flap position. Thus, when a tray is inserted into any of the slots 104, the lever 106 is not movable from its closed position to its open position, and the enclosure 102 is effectively locked in place. That is, when any of the slots 104 contains a tray, the enclosure 102 cannot be removed from the rack. By comparison, when all of the slots 104 are empty, the lever 106 is movable from its closed position to its open position, and the enclosure 102 can therefore be removed from the rack.

The pins 110 have a first pins position in which the lever 106 is movable from its closed position to its open position, as well as a second pins position in which the lever 106 is prevented from moving from the closed position to the open position. The second pins position as particularly depicted in FIG. 2. The pins 110 are capable of moving within corresponding slots, as indicated by the arrows 111. In the second pins position, the pins 110 block the lever 106 from moving in the direction indicated by the arrows 107, and thus prevent the lever 106 from moving from the closed position to the open position. By comparison, when the pins 110 are in the first pins position, such that they are at the other end of their corresponding slots (i.e., at the end opposite to the end in which they are depicted in FIG. 2), the pins 110 no longer block the lever 106 from moving in the direction indicated by the arrows 107. As such, the lever 106 is not prevented from moving from the closed position to the open position.

Stated another way, in the first pins position, the pins 110 do not block the lever 106 so that the lever is able to move from its closed position to its open position. By comparison, in the second pins position, the pins 110 block the lever 106 so that it is not able to move from its closed position to its open position. In this way, the pins 110 assist in controlling when the enclosure 102 is able to be removed from the rack.

It is noted that in the first flap position, the flap 108 indirectly allows the lever 106 to move from the closed position to the open position, in that the flap 108 allows the pins 110 to move from the second pins position to the first pins position. Furthermore, it is noted that in the second flap position, the flap 108 indirectly prevents the lever 106 to move from the closed position to the open position, in that the flap 108 prevents the pins 110 from moving from the second pins position to the first pins position.

The release button 112 can be pressed in the direction indicated by the arrow 113. The release button 112 is coupled to the pins 110. That is, the pins 110 extend from the opposite side of body of the release button 112 that is shown in FIG. 1, through the slots as shown in FIG. 2. Therefore, pressing the release button 112 in the direction indicated by the arrow 113 causes the pins 110 to move downward to the other end of their slots. Stated another way, pressing the release button 112 in the direction indicated by the arrow 113 also results in the pins moving from the second pins position depicted in FIG. 2 to the first pins position.

In the first flap position, the flap 108 does not block the path that the release button 112 travels when being pressed. As a result, the release button 112 can be pressed when the flap 108 is in its first flap position, such that the pins 110 can move from the second pins position to the first pins position. By comparison, in the second flap position, the flap 108 blocks the path that the release button 112 travels when being pressed. As a result, the release button 112 cannot be pressed when the flap 108 is in its second flap position, such that the pins 110 cannot move from the second pins position to the first pins position.

The springs 114 are more generally a spring-hinging mechanism. The springs 114 are sprung and disposed so that they force the flap 108 to revert and default to the first flap position as shown in FIG. 1. That is, it can be said that the flap 108 is spring-loaded so that it reverts and defaults to the first flap position depicted in FIG. 1, when there are no trays forcing or causing the flap 108 to enter the second flap position. Upon complete emptying of the slots 104, such that no hard disk drive trays populated any of the slots 104, the springs 114 thus cause the flap 108 to move to the first flap position. Complete details of the springs 114 are not shown in FIG. 1; however, such spring-type hinging mechanisms are known to those of ordinary skill within the art.

It is noted that in one embodiment of the invention, the flap 108, the pins 110, the release button 112, and/or the springs 114 can be part of a mechanism or a means to prevent the lever 106 from moving from its closed position to its open position when any of the slots 104 is occupied by a tray capable of holding one or more hard disk drives. That is, these various parts work together to prevent the lever 106 from moving to its open position when any of the slots 104 is occupied by or contains a tray, so that the hard disk enclosure blade 100 cannot be removed from a rack. Furthermore, these various parts work together to allow the lever 106 to move to its open position when all of the slots 104 are empty of trays, so that the hard disk enclosure blade 100 can be removed.

Figure 3A:
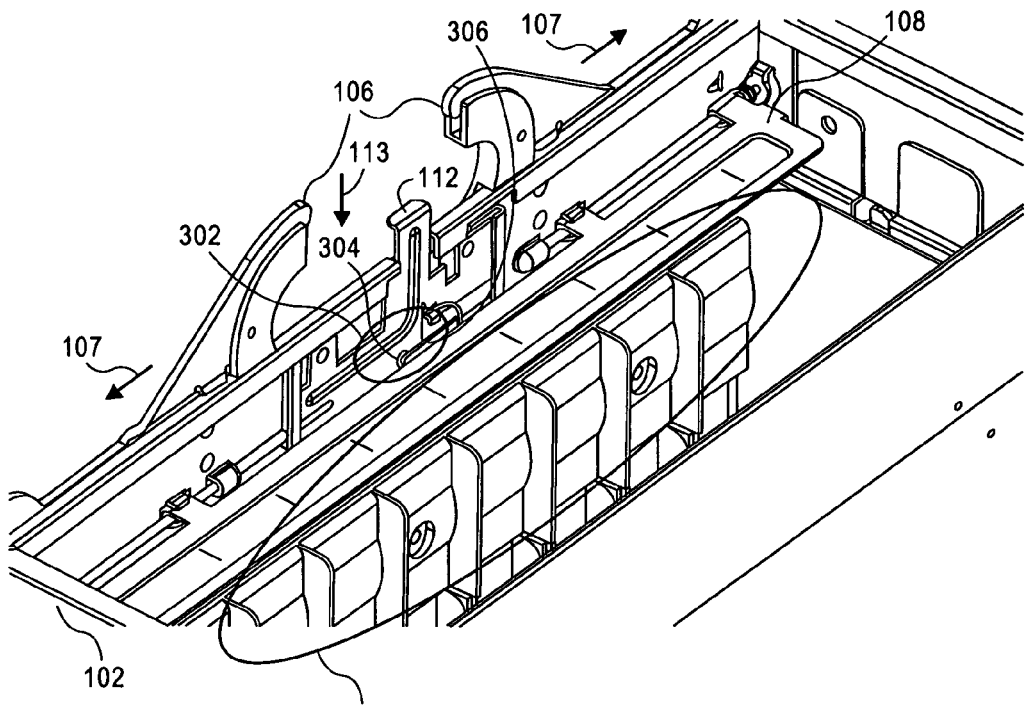
FIGS. 3A and 3B are diagrams of a flap of a hard disk enclosure blade in a first flap position and a second flap position, respectively, according to an embodiment of the invention.
Figure 3B:
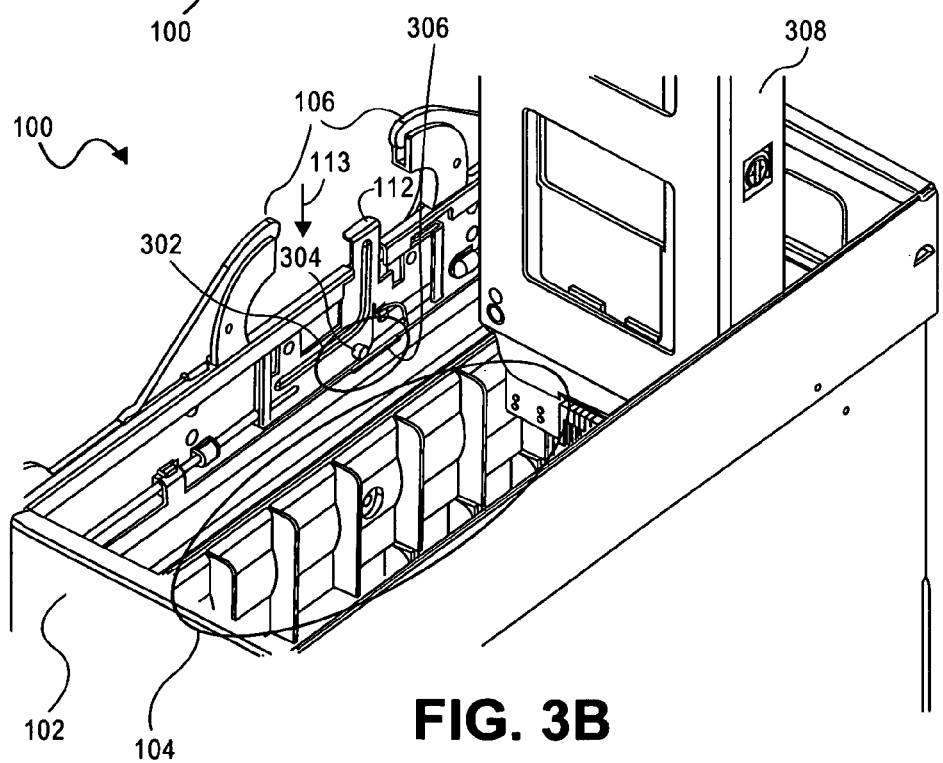

FIGS. 3A and 3B show the first flap position and the second flap position, respectively, of the flap 108 of the hard disk enclosure blade 100, according to an embodiment of the invention. In FIG. 3A, none of the slots 104 are occupied or contain a hard disk drive tray. As a result, the flap 108 is disposed across the slots 104. The release button 112 is allowed, upon being pressed, to move in the direction indicated by the arrow 113. As has been described, this allows the lever 106 to be moved from its closed position, as depicted in FIG. 3A, to the open position, which results upon movement of the two portions of the lever 106 in the direction indicated by the arrows 107, outwards.

What allows the release button 112 to be moved in the direction indicated by the arrow 113 is that a protrusion 304 extending from the body of the release button 112 is underneath a corresponding bracket 306 of the flap 108, within the circled area 302. As a result, the protrusion 304 is not blocked by the bracket 306, such that the release button 112 can move in the direction indicated by the arrow 113. In this way, the flap 108 indirectly allows the lever 106 to move from the closed position to the open position when the flap 108 is in the first flap position.

By comparison, in FIG. 3B, one of the slots 104 is occupied or contains a hard disk drive tray 308. In particular, the hard disk drive tray 308 is being inserted into one of the slots 104. As a result, the flap 108 is pushed against a side of the enclosure 102 as shown in FIG. 3B. That is, the flap 108 is caused to move to the second flap position. The release button 112 is prevented from moving in the direction indicated by the arrow 113. Therefore, the lever 106 can no longer move from its closed position, as depicted in FIG. 3B, to the open position.

What prevents the release button 112 from being moved in the direction indicated by the arrow 113 is that the protrusion 304 extending from the body of the release button 112 is now blocked by the bracket 306 of the flap 108, within the circled area 302. That is, movement of the flap 108 from the first flap position of FIG. 3A to the second flap position of FIG. 3B causes the bracket 306 to correspondingly rotate, such that the protrusion 304 is no longer underneath the bracket 306, but rather is blocked from further movement in the direction indicated by the arrow 113 by the bracket 306. Therefore, the release button 112 as a whole cannot move in the direction indicated by the arrow 113. In this way, the flap 108 indirectly prevents the lever 106 from moving from the closed position to the open position when the flap 108 is in the second flap position.

Figure 4A:
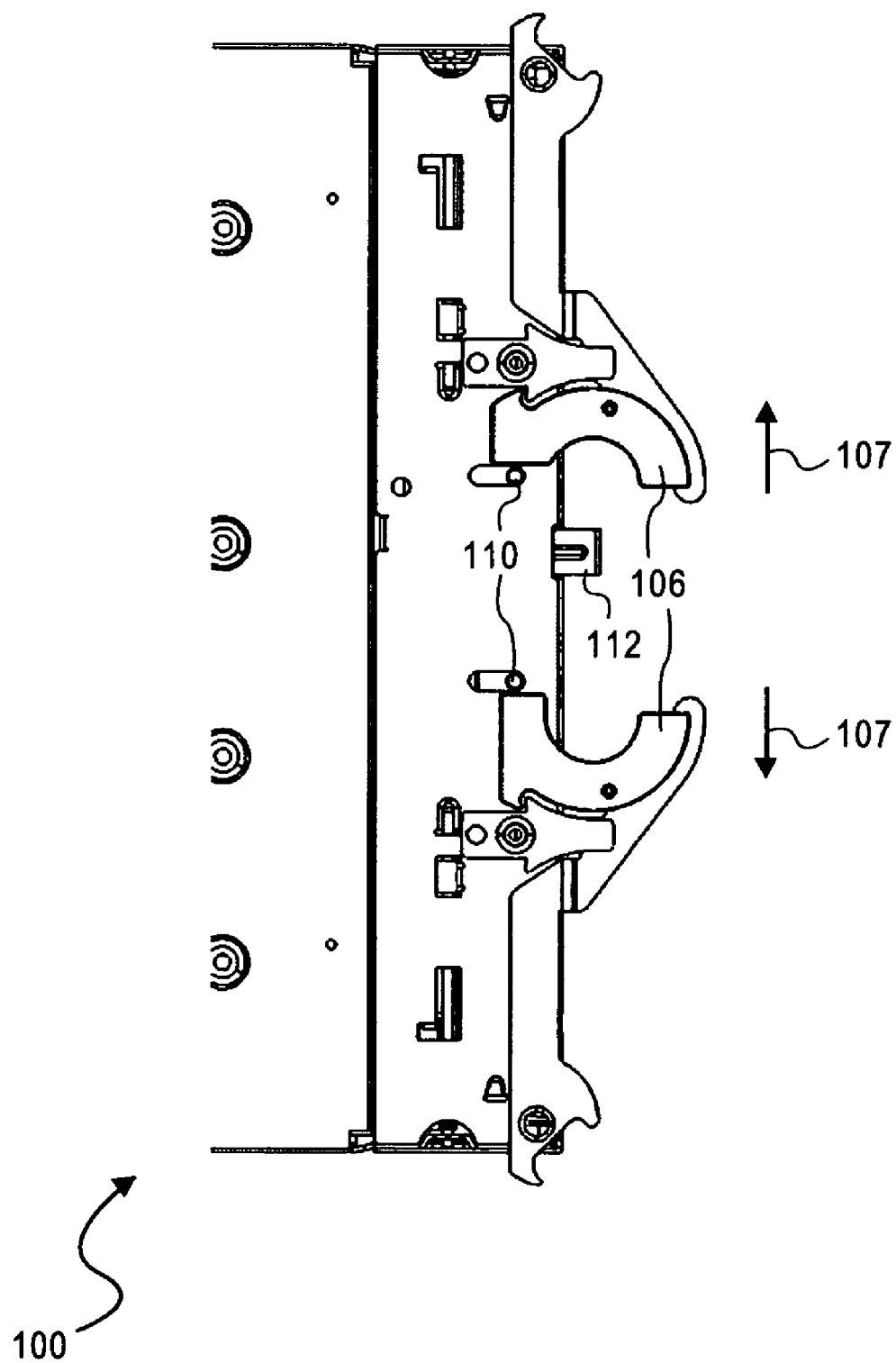
FIGS. 4A, 4B, and 4C are diagrams of a hard disk enclosure blade in which a lever thereof is locked, and not capable of moving from a closed position to an open position, according to an embodiment of the invention.
Figure 4B:
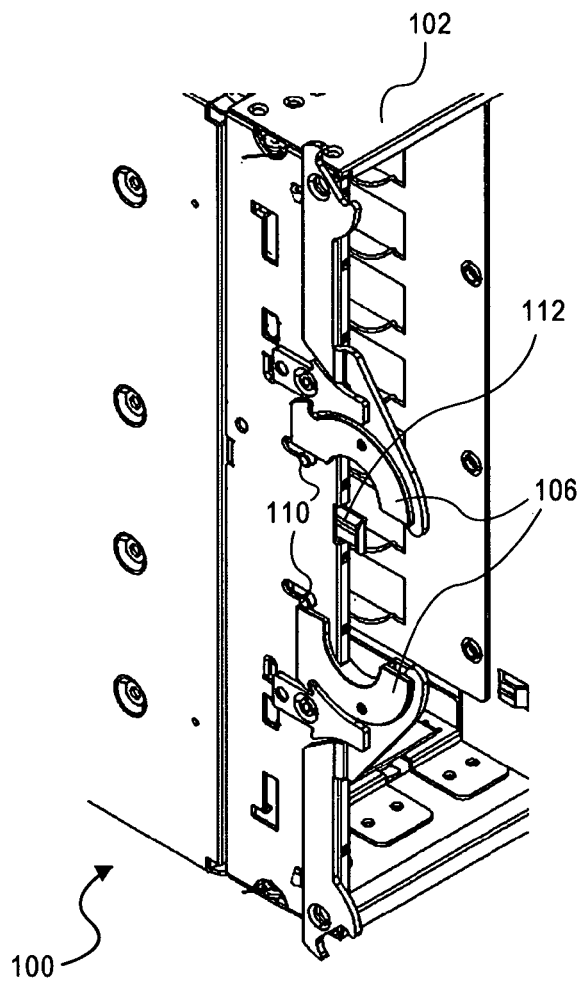
Figure 4C:
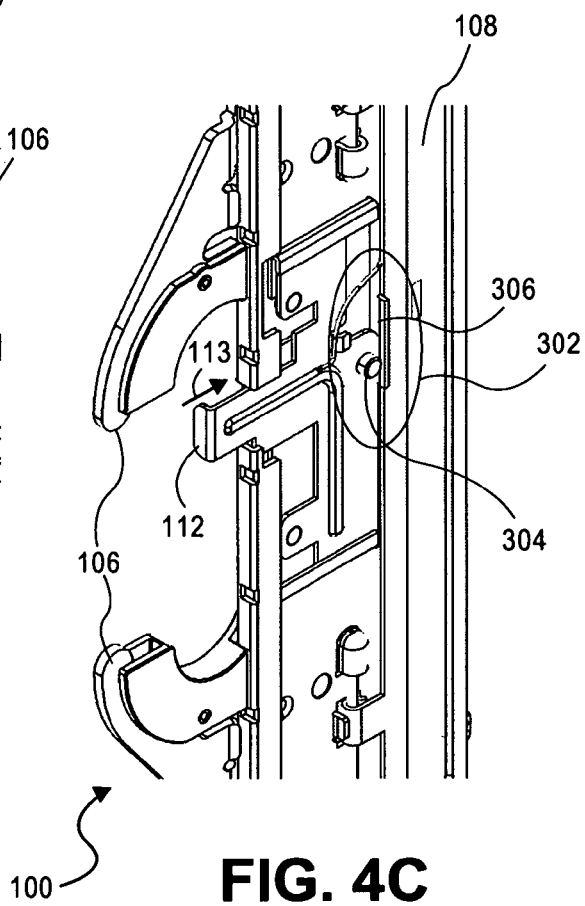

FIGS. 4A, 4B, and 4C show the hard disk enclosure blade 100 in which the lever 106 is locked, such that it cannot move from its closed position to its open position, according to an embodiment of the invention. Thus, in FIGS. 4A, 4B, and 4C, the pins 110 are in the second pins position that have been described. Furthermore, the flap 108 is in the second flap position that has been described. No hard disk drive trays are depicted in FIGS. 4A, 4B, and 4C, but at least one such tray is present in one of the slots, which is not shown for illustrative convenience.

Ins FIGS. 4A and 4B specifically, the pins 110 are in the second pins position, which prevents the lever 106 from being moved from the closed position as shown in FIGS. 4A and 4B to the open position that has been described. That is, in FIGS. 4A and 4B, the portions of the lever 106 cannot be moved outwards as indicated by the arrows 107. This is because the pins 110 in the second pins position prevent such movement. As such, the release button 112 cannot be pushed down.

In FIG. 4C specifically, the bracket 306 of the flap 108 blocks the protrusion 304 extending from the body of the release button 112, within the circled area 302, since the flap 108 is in the second flap position. As a result, the release button 112 cannot be pressed in the direction indicated by the arrow 113. As such, the lever 106 is locked, and cannot be moved from its closed position to its open position. Also shown in FIG. 4C is the spring 114, where the spring is specifically within the area indicated by the reference number 114.

Figure 5A:
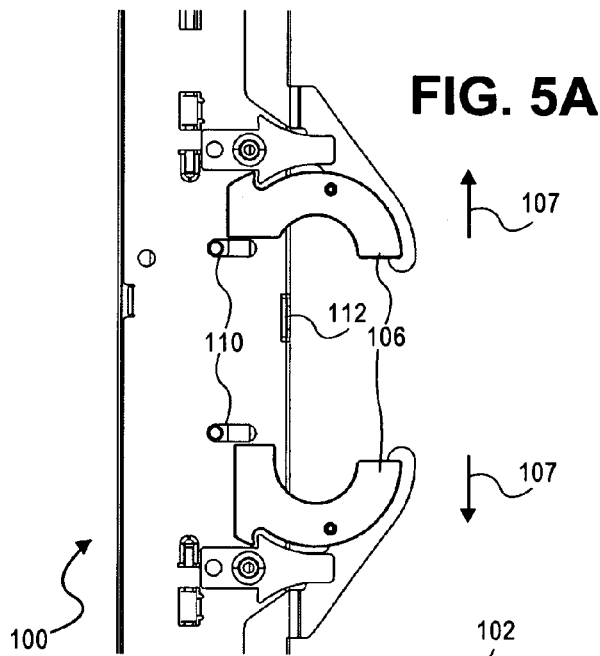
FIGS. 5A, 5B, and 5C are diagrams of a hard disk enclosure blade in which a lever thereof is unlocked, and thus capable of moving from a closed position to an open position, according to an embodiment of the invention.
Figure 5B:
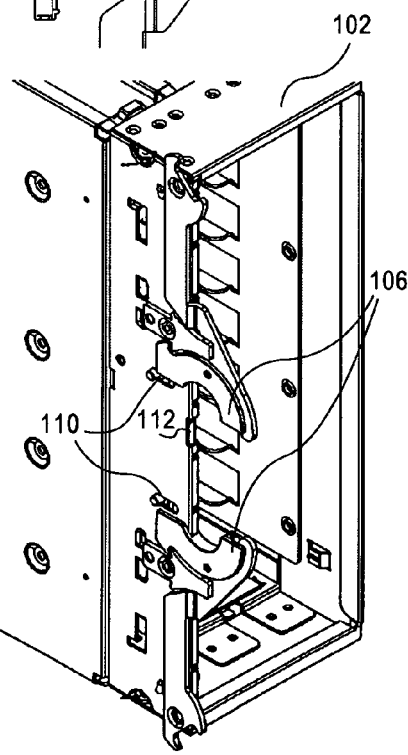
Figure 5C:
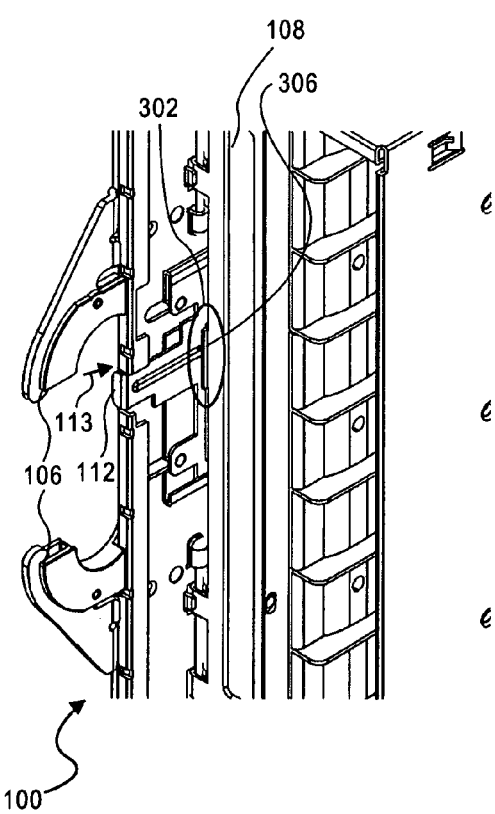

FIGS. 5A, 5B, and 5C show the hard disk enclosure blade 100 in which the lever 106 is unlocked, such that it can move from its closed position to its open position, according to an embodiment of the invention. Thus, in FIGS. 5A, 5B, and 5C, the pins 110 are in the first pins position that has been described. Furthermore, the flap 108 is in the first flap position that has been described. The lever 112 has been pushed or pressed in the direction indicated by the arrow 113 in FIG. 5C.

In FIGS. 5A and 5B specifically, the pins 110 are in the first pins position, which allows the lever 106 to be moved from the closed position as shown in FIGS. 5A and 5B to the open position that has been described. That is, in FIGS. 5A and 5B, the portions of the lever 106 can move outwards as indicated by the arrows 107. This is because the pins 110 in the first pins position do not prevent such movement. The release button 112 can, and has, been pushed down.

In FIG. 5C specifically, the bracket 306 of the flap 108 does not block the protrusion extending from the body of the release button 112, since the flap 108 is in the second flap position. As a result, the release button 112 can, and has, been pushed in the direction indicated by the arrow 113. The protrusion extending from the body of the release button 112 is not particularly shown in FIG. 5C, since it is hidden from view as a result of the release button 112 having been pushed. The lever 106 is thus in an unlocked position, and can be moved from its closed position to its open position. Also shown in FIG. 5C is the spring 114, where the spring is specifically within the area indicated by the reference number 114.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A hard disk enclosure blade comprising:
   an enclosure insertable into a rack;
   a plurality of slots, each slot receptive to a tray capable of holding one or more hard disk drives;

a lever by which the enclosure is pushed into the rack and pulled out of the rack, the lever having an open position in which the enclosure is removable from the rack and a closed position in which the enclosure is not removable from the rack; and, a flap having a first flap position in which the flap is disposed across the slots and the lever is movable from the closed position to the open position, and a second flap position in which the lever is not movable from the closed position to the open position, wherein where the slots are all empty, the flap reverts to the first flap position, and where insertion of a tray into one of the slots forces the flap to the second flap position.

2. The hard disk enclosure blade of claim 1, further comprising one or more pins, the pins having a first pins position in which the lever is movable from the closed position to the open position, and a second pins position in which the lever is prevented from moving from the closed position to the open position, wherein, in the first flap position, the flap indirectly allows the lever to move from the closed position to the open position, in that, in the first flap position, the flap allows the pins to move from the second pins position to the first pins position, and wherein, in the second flap position, the flap indirectly prevents the lever to move from the closed position to the open position, in that, in the second flap position, the flap prevents the pins from moving from the second pins position to the first pins position.

3. The hard disk enclosure blade of claim 2, further comprising a release button coupled to the pins, pressing the release button causing the pins to move from the second pins position to the first pins position where the flap is in the first flap position.

4. The hard disk enclosure blade of claim 3, wherein, in the first flap position, the flap does not block a path that the release button travels when being pressed so that the release button is able to cause the pins to move from the second pins position to the first pins position, and, in the second flap position, the flap blocks the path that the release button travels when being pressed so that the release button is unable to cause the pins to move from the second pins position to the first pins position.

5. The hard disk enclosure blade of claim 2, wherein, in the first pins position, the pins do not block the lever so that the lever is able to move from the closed position to the open position, and in the second pins position, the pins block the lever so that the lever is unable to move from the closed position to the open position.

6. The hard disk enclosure blade of claim 1, further comprising a spring to default the flap to the first flap position and to revert the flap to the first flap position upon complete emptying of the slots.

7. The hard disk enclosure blade of claim 1, wherein insertion of a tray into one of the slots, where the slots are previously empty, pushes the flap so that the flap enters the second flap position.

8. A hard disk enclosure blade comprising:
an enclosure insertable into a rack;
a plurality of slots, each slot receptive to a tray capable of holding one or more hard disk drives;
a lever by which the enclosure is pushed into the rack and pulled out of the rack, the lever having an open position in which the enclosure is removable from the rack and a closed position in which the enclosure is not removable from the rack; and, means for preventing the lever from moving from the closed position to the open position when any of the slots is occupied by a tray capable of holding one or more hard disk drives.

9. The hard disk enclosure blade of claim 8, wherein the means comprises a flap, the flap having a first flap position in which the flap is disposed across the slots and the lever is movable from the closed position to the open position, and a second flap position in which the lever is not movable from the closed position to the open position.

10. The hard disk enclosure blade of claim 9, wherein, where the slots are all empty, the flap reverts to the first flap position, and where insertion of a tray into one of the slots forces the flap to the second flap position.

11. The hard disk enclosure blade of claim 8, wherein the means comprises one or more pins, the pins having a first pins position in which the lever is movable from the closed position to the open position, and a second pins position in which the lever is prevented from moving from the closed position to the open position.

12. The hard disk enclosure blade of claim 11, wherein the means further comprises a flap, the flap having a first flap position and a second flap position, in the first flap position the flap allows the pins to move from the second pins position to the first pins position, and in the second flap position the flap prevents the pins from moving from the second pins position to the first pins position.

13. The hard disk enclosure blade of claim 12, wherein the means further comprises a release button coupled to the pins, pressing the release button causing the pins to move from the second pins position to the first pins position where the flap is in the first flap position.

14. A hard disk enclosure blade comprising:
an enclosure insertable into a rack;
a plurality of slots, each slot receptive to a tray capable of holding one or more hard disk drives;
a lever by which the enclosure is pushed into the rack and pulled out of the rack, the lever having an open position in which the enclosure is removable from the rack and a closed position in which the enclosure is not removable from the rack; and,
a mechanism to prevent the lever from moving from the closed position to the open position when any of the slots is occupied by a tray capable of holding one or more hard disk drives,
wherein the mechanism comprises a flap, the flap having a first flap position in which the flap is disposed across the slots and the lever is movable from the closed position to the open position, and a second flap position in which the lever is not movable from the closed position to the open position.

15. The hard disk enclosure blade of claim 14, wherein, where the slots are all empty, the flap reverts to the first flap position, and where insertion of a tray into one of the slots forces the flap to the second flap position.

16. The hard disk enclosure blade of claim 14, wherein insertion of a tray into one of the slots, where the slots are previously empty, pushes the flap so that the flap enters the second flap position.

* * * * *